(12) United States Patent
Li et al.

(10) Patent No.: US 12,432,254 B2
(45) Date of Patent: Sep. 30, 2025

(54) HEADER ENRICHMENT FOR HYPERTEXT TRANSFER PROTOCOL SECURE

(71) Applicant: ZTE Corporation, Guangdong (CN)

(72) Inventors: Zhijun Li, Shenzhen (CN); Yuanjun Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 398 days.

(21) Appl. No.: 18/154,298

(22) Filed: Jan. 13, 2023

(65) Prior Publication Data

US 2023/0164186 A1 May 25, 2023

Related U.S. Application Data

(63) Continuation of application No. PCT/CN2020/102908, filed on Jul. 20, 2020.

(51) Int. Cl.
*H04L 9/40* (2022.01)
*H04L 67/02* (2022.01)
*H04L 69/22* (2022.01)

(52) U.S. Cl.
CPC ............ *H04L 63/168* (2013.01); *H04L 67/02* (2013.01); *H04L 69/22* (2013.01); *H04L 63/0236* (2013.01); *H04L 63/166* (2013.01)

(58) Field of Classification Search
None
See application file for complete search history.

(56) References Cited

U.S. PATENT DOCUMENTS

| 7,743,245 | B2 * | 6/2010 | Khosravi | H04L 69/326 |
| | | | | 713/168 |
| 8,982,893 | B2 * | 3/2015 | Akhtar | H04L 67/61 |
| | | | | 709/219 |
| 10,171,548 | B2 * | 1/2019 | Kant | H04W 80/06 |
| 10,425,446 | B2 * | 9/2019 | Kasbekar | H04L 63/166 |
| 10,554,718 | B2 | 2/2020 | Uppili et al. | |
| 10,880,729 | B2 * | 12/2020 | Shlomo | H04W 8/26 |
| 10,931,715 | B2 * | 2/2021 | Kasbekar | H04L 69/321 |
| 11,004,106 | B2 * | 5/2021 | Neumann | H04L 67/146 |

(Continued)

FOREIGN PATENT DOCUMENTS

CN 105939317 A 9/2016
CN 107077432 A 8/2017
(Continued)

OTHER PUBLICATIONS

Nokia et al., "Packet Detection Information," 3GPP TSG CT Meeting #78, CP-173145, Lisbon, Portugal, Dec. 18-19, 2017 (18 pages).

(Continued)

*Primary Examiner* — Backhean Tiv
(74) *Attorney, Agent, or Firm* — Perkins Coie LLP

(57) ABSTRACT

Methods, apparatus, and systems for enhancing the CP Function and UP Function to support the header enrichment for HTTPS are disclosed. In one example aspect, the method includes transmitting, by a first communication component, to a second communication component, a session message instructing the second communication component to detect one or more messages from a user device based on a communication security protocol, wherein the session message includes detection information for the communication security protocol.

17 Claims, 10 Drawing Sheets

(56) References Cited

U.S. PATENT DOCUMENTS

| | | | |
|---|---|---|---|
| 11,848,961 B2* | 12/2023 | Kasbekar | H04L 69/321 |
| 2013/0024523 A1* | 1/2013 | Albasheir | H04W 76/32 |
| | | | 709/206 |
| 2014/0143855 A1* | 5/2014 | Keoh | H04L 63/123 |
| | | | 726/14 |
| 2014/0304498 A1* | 10/2014 | Gonuguntla | H04L 63/0281 |
| | | | 713/151 |
| 2016/0094581 A1* | 3/2016 | Kasbekar | H04L 63/0281 |
| | | | 713/151 |
| 2016/0119788 A1* | 4/2016 | Mandyam | H04L 65/1016 |
| | | | 455/411 |
| 2019/0116535 A1* | 4/2019 | Szilagyi | H04W 24/10 |
| 2020/0021614 A1* | 1/2020 | Kasbekar | H04L 63/0281 |
| 2020/0336321 A1* | 10/2020 | Ding | H04L 12/14 |
| 2020/0404497 A1* | 12/2020 | Yuan | H04W 12/06 |
| 2022/0086691 A1* | 3/2022 | Ihlar | H04W 28/10 |
| 2023/0164186 A1* | 5/2023 | Li | H04L 63/168 |
| | | | 726/3 |

FOREIGN PATENT DOCUMENTS

| | | |
|---|---|---|
| CN | 110234112 A | 9/2019 |
| CN | 110858834 A | 3/2020 |

OTHER PUBLICATIONS

ZTE, "Header Enrichment," 3GPP TSG CT WG4 Meeting #86bis, C4-187052, Vilnius, Republic of Lithuania, Oct. 15-19, 2018 (2 pages).

International Search Report and Written Opinion for International Application No. PCT/CN2020/102908, mailed on Mar. 25, 2021 (9 pages).

3GPP, "Technical Specification Group Services and System Aspects; Study on encrypted traffic detection and verification (Release 16)," 3GPP TR 23.787 V0.3.0 (Apr. 2018), 38 pages.

Office Action for Chinese Patent Application No. 202080102813.5, mailed Oct. 30, 2024 (53 pages).

CNIPA, Second Office Action for Chinese Application No. 202080102813.5, mailed on May 9, 2025, 54 pages with unofficial English translation.

* cited by examiner

500

Transmit, by a first communication component, to a second communication component, a session message instructing the second communication component to detect one or more messages from a user device based on a communication security protocol, wherein the session message includes detection information for the communication security protocol — 510

Transmit, by a first communication component, to a second communication component, a session message instructing the second communication component to insert one or more customized headers into one or more messages from a user device based on a communication security protocol, wherein the session message includes header enrichment information associated with the one or more messages from the user device based on the communication security protocol ⸺610

FIG. 6

HEADER ENRICHMENT FOR HYPERTEXT TRANSFER PROTOCOL SECURE

CROSS REFERENCE TO RELATED APPLICATIONS

This patent document is a continuation of and claims benefit of priority to International Patent Application No. PCT/CN2020/102908, filed on Jul. 20, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, methods, apparatus, and systems for enhancing the CP Function and UP Function to support the header enrichment for HTTPS.

In one aspect, a data communication method includes transmitting, by a first communication component, to a second communication component, a session message instructing the second communication component to detect one or more messages from a user device based on a communication security protocol, wherein the session message includes detection information for the communication security protocol.

In another aspect, a data communication method includes transmitting, by a first communication component, to a second communication component, a session message instructing the second communication component to insert one or more customized headers into one or more messages from a user device based on a communication security protocol, wherein the session message includes header enrichment information associated with the one or more messages from the user device based on the communication security protocol.

In another aspect, a data communication method includes receiving, by a second communication component, from a first communication component, detection information for a communication security protocol, and detecting, by the second communication component, one or more messages from a user device based on the communication security protocol.

In another aspect, a data communication method includes receiving, by a second communication component, from a first communication component, header enrichment information associated with a message based on a communication security protocol, detecting, by the second communication component, one or more messages from a user device based on the communication security protocol, and inserting, by the second communication component, one or more header field names and values indicated by the header enrichment information into the one or more messages.

These, and other, aspects are described in the present document.

BRIEF DESCRIPTION OF DRAWINGS

FIG. 5 shows an example of a data communication method based on some embodiments of the disclosed technology.

FIG. 6 shows another example of a data communication method based on some embodiments of the disclosed technology.

DETAILED DESCRIPTION

Figure 1:
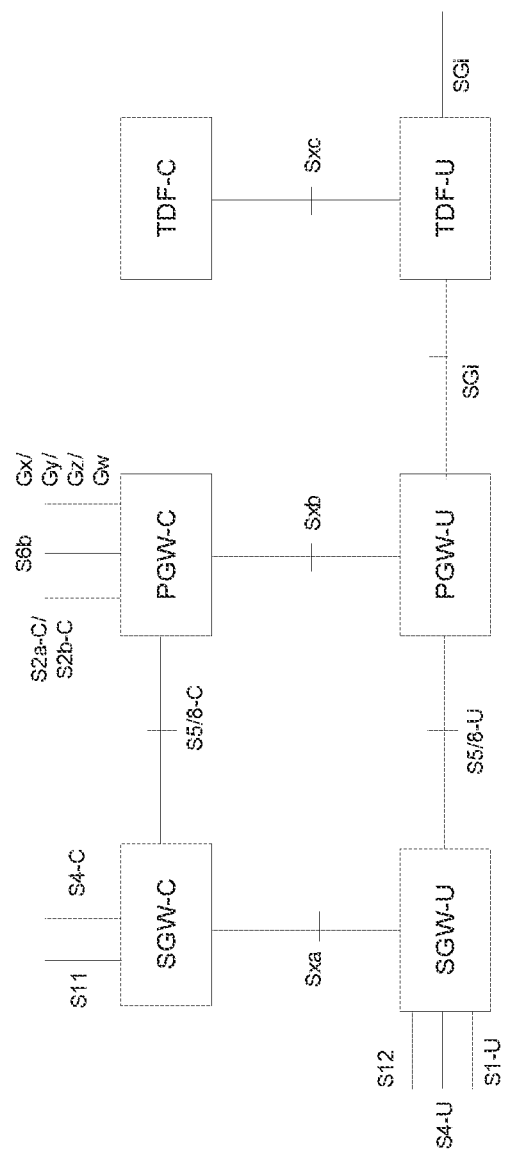
FIG. 1 shows an example of a control and user plane separation (CUPS) architecture where a control plane (CP) function includes SGW-C/PGW-C/TDF-C and a user plane (UP) function includes SGW-U/PGW-U/TDF-U.

Certain features are described using the example of Fifth Generation (5G) wireless protocol. However, applicability of the disclosed techniques is not limited to only 5G wireless systems.

In example telecommunication systems, a single network entity performs Packet Data Network (PDN)/Packet Data Unit (PDU) session management and user plane traffic routing/forwarding, such as Gateway General Packet Radio Service (GPRS) Support Node (GGSN) in 3G system and PDN Gateway (PGW) in 4G system. Although such a model provides simplicity to the network entity programming, it may not satisfy the requirement for the dynamical and flexible traffic routing introduced in various deployment scenarios. For example, Mobile Edge Computing (MEC) normally requires the traffic routed locally, while an internet service normally requires the traffic routed to the upper layer application server via core network traffic routing entities.

To support various traffic routing requirements, Control and User Plane Separation (CUPS) is introduced from 4G onwards. Within the CUPS architecture, a control plane (CP) function provides the PDN/PDU session management functionalities, while a user plane (UP) function provides the user plane traffic routing/forwarding functionalities.

Internet services should be under the security inspection of internet service providers. To this end, the CUPS architecture is required to support the header enrichment functionality, which includes the process of inserting key information of a mobile user (e.g. IMSI or MSISDN) in the HTTP headers when the mobile user browses specific web sites using Hypertext Transfer Protocol (HTTP) schema.

In the procedures associated with the CUPS architecture, the CP function provides a header enrichment information element (Header Enrichment IE) to the UP function during a packet forwarding control protocol (PFCP) session establishment or modification procedures. The Header Enrichment IE indicates a header type (e.g. set to HTTP), and a list of header field name and its value. The UP function thus inserts the indicated mobile user information in corresponding HTTP headers or HTTP customer headers when detecting the outgoing HTTP request to the indicated web site. As a result, the web server receiving the HTTP request from the mobile user checks the HTTP headers and extracts the mobile user information (e.g. IMSI) for further usage, e.g., tracking the web browse records of an indicated mobile user.

In one example implementation, the CUPS architecture that supports the header enrichment for HTTP does not support the header enrichment for an extension of the HTTP such as HTTPS (Hypertext Transfer Protocol Secure). As the HTTP messages are encapsulated in the secured Secure Sockets Layer (SSL)/Transport Layer Security (TLS) packets, and the UP function is not able to decrypt the HTTP message from the SSL/TLS packets, it is not possible for the UP function to insert mobile user information to the HTTP headers of HTTP messages within SSL/TLS packets.

The CUPS procedures implemented based on some embodiments of the disclosed technology, however, can enhance the CP function and/or the UP function to support the header enrichment for HTTPS.

FIG. 1 shows an example of a control and user plane separation (CUPS) architecture where a control plane (CP) function includes SGW-C, PGW-C, and TDF-C and a user plane (UP) function includes SGW-U, PGW-U, and TDF-U.

A CUPS architecture implemented based on some embodiments of the disclosed technology can include a plurality of network entities, including a serving gateway (SGW), a PDN Gateway (PGN), and a traffic detection function (TDF).

The SGW terminates the user plane interface towards E-UTRAN, and provides mobility anchor during inter-eNodeB handover. The SGW-C(SGW Control Plane) controls the SGW-U (SGW User Plane) via Sxa interface.

The PDN GW is the gateway which terminates the SGi interface towards the PDN (Packet Data Network). The PGW allocates IP address for a UE and provides IP traffic routing and forwarding functionality. The PGW-C (PGW Control Plane) controls the PGW-U (PGW User Plane) via Sxb interface.

The TDF provides capability to detect traffic flow for specific service and application. The TDF-C (TDF Control Plane) controls the TDF-U (TDF User Plane) via Sxc interface.

Figure 2:
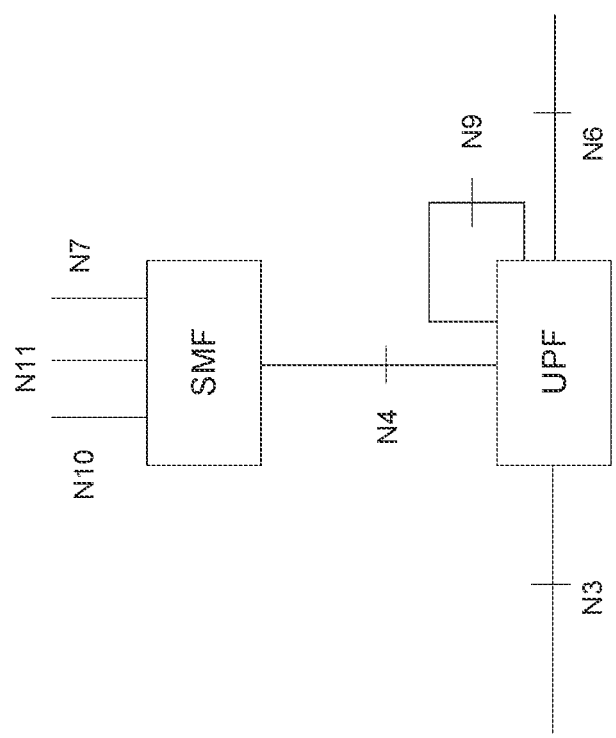
FIG. 2 shows an example of the CUPS architecture in 5G system, where the CP function is SMF (Session Management Function) and the UP function is UPF (User Plane Function).

FIG. 2 shows an example of the CUPS architecture in 5G system, where the CP function is SMF (Session Management Function) and the UP function is UPF (User Plane Function).

A CUPS architecture implemented based on some embodiments of the disclosed technology can include a plurality of network functions, including a session management function (SMP) and a user plane function (UPF).

The SMF provides a plurality of functionalities, including session establishment, modification and release, UE IP address allocation and management (including optional authorization functions), selection and control of UP function, and downlink data notification. The SMF controls the UPF via N4 association.

The UPF includes a plurality of functionalities, including serving as an anchor point for intra-/inter-radio access technology (RAT) mobility, packet routing and forwarding, traffic usage reporting, QoS handling for the user plane, and downlink packet buffering and downlink data notification triggering.

In CUPS architecture, the CP function and UP function are general concepts. The CP function covers the SGW-C/PGW-C/TDF-C in 4G system and the SMF in 5G system, and the UP Function covers the SGW-U/PGW-U/TDF-U in 4G system and the UPF in 5G system The PFCP protocol is used by the CP function to control the UP function. For example, the PFCP protocol is used to establish a PFCP association between the CP function and UP function and manage the PFCP session for a UE.

In order for the UP function to perform the header enrichment for HTTP, the CP function provides header enrichment instructions to the UP function during a PFCP session establishment procedure or a PFCP session modification procedure.

Figure 3:
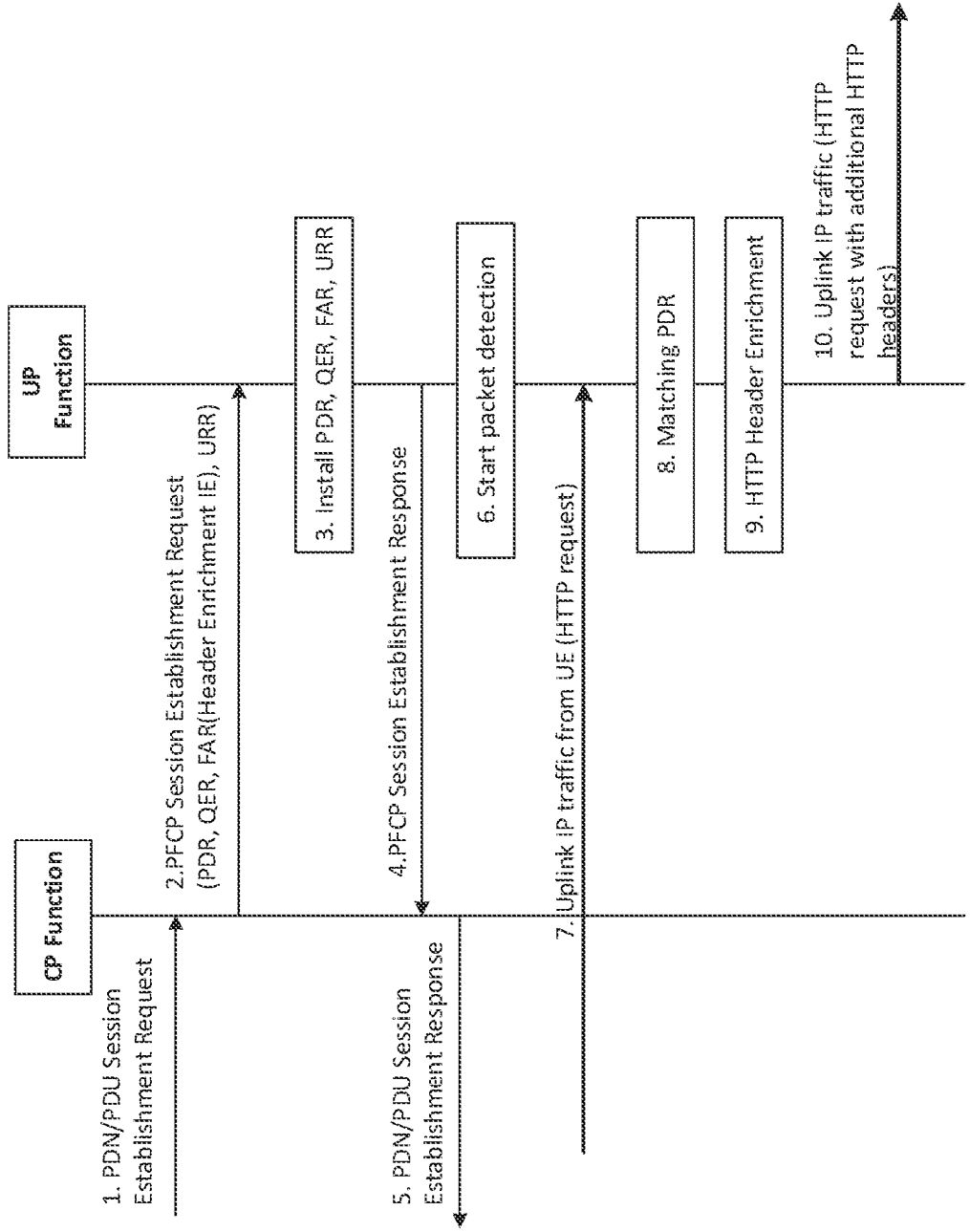
FIG. 3 shows an example of packet forwarding control protocol (PFCP) session establishment procedure used by the CP function and/or UP function to support the header enrichment for HTTP based on some example embodiments of the disclosed technology.

FIG. 3 shows an example of packet forwarding control protocol (PFCP) session establishment procedure used by the CP function and/or UP function to support the header enrichment for HTTP based on some example embodiments of the disclosed technology.

During the PFCP session establishment/modification procedure, the CP function provides necessary information to the UPF to instruct the UP function to perform the header enrichment for HTTP.

The CP function is triggered to establishment the PFCP session to the UP function. In some implementations, the CP function is triggered by either a PDN connection establishment request message from the MME (for 4G) or a PDU session establishment request message from the AMF (for 5G).

The CP function selects a proper UP function based on access point name (APN)/data network name (DNN) and other information.

The CP function sends the PFCP Session establishment request to the selected UP function, carrying packet detection rule (PDR), QOS enforcement rule (QER), forwarding action rule (FAR), and usage reporting rule (URR).

The PDR defines the packet filters for service data flows, e.g. to filter out the uplink/downlink traffic from/to a specific application (e.g. HTTP message to a specific website).

In the PDR, one or more service data flow (SDF) filters may be present to express the packet filter for a specific service data flow.

The QER is associated with at least one PDR and defines how to control the QoS of the detected service flow.

The FAR is associated with at least one PDR and defines how to route and forward the detected service flow. For example, the mobile edge computing (MEC) traffic may be required to route to local servers.

If the header enrichment is required, one or more header enrichment IEs are included in the FAR to instruct the UP function to add specific headers (e.g. HTTP header) to the detected service flow (e.g. HTTP message). The header enrichment IE may include at least one of header type, header field name, and header field value.

The URR is associated with at least one PDR and defines how to report the volume/time usage of the detected service flow and how to report the usage to the CP function.

In some example implementations, in order to perform the header enrichment for HTTP, the CP function may provide an appropriate PDR, which can filter out the outgoing HTTP request from the UE to the web server.

In some example implementations, in order to perform the header enrichment for HTTP, the CP function may also, within the FAR associated to the PDR, provide an appropriate header enrichment IE by setting the header type to HTTP and by indicating the header field name to be added and its value.

Upon receiving the PFCP session establishment request from the CP function, the UP function installs the received rules (i.e., PDR/QER/FAR/URR) for this PFCP session.

The UP function sends back the PFCP session establishment response message to the CP function.

The CP Function responds to the trigger entity of the PDN connection/PDU session establishment, by sending PDN connection/PDU session establishment response message.

The UP function starts to detect the uplink/downlink traffic from/to the UE, and tries to match the receiving IP packets with the PDR(s). If an incoming IP packet matches one PDR, the corresponding QER/URR/FAR is performed.

Subsequently, the UE initiates uplink traffic towards the server. In this example, the UE sends an HTTP request to the dedicated web server.

The UP function inspects the uplink traffic from the UE to detect whether it matches one of the installed PDRs. In this example, the uplink traffic (e.g., HTTP request from the UE) matches the PDR targeting to detect the HTTP request from the UE.

The UP Function performs Header Enrichment for HTTP, i.e. add the indicated header fields and its value to the HTTP headers (e.g. custom HTTP headers) of the outgoing HTTP request.

The UP function sends the altered IP packets onwards, and thus the inserted header fields (e.g., the header field names and corresponding values) are transmitted to the remote server.

As illustrated in FIG. 3, as the UE requests HTTP content from a web server using HTTP schema, the HTTP messages between the UE and the web server are transmitted in clear text. Hence, the UPF is able to extract the HTTP messages from the incoming IP packets, and parse the HTTP message to add the required field name(s) and its value(s) in the HTTP headers.

If the UE requests HTTP context from a web server using HTTPS schema, the HTTP messages are encrypted in SSL/TLS packets. Therefore, the UPF may not unpack the SSL/TLS packets to extract the HTTP messages, rendering the header enrichment for HTTPS impractical.

Figure 4:
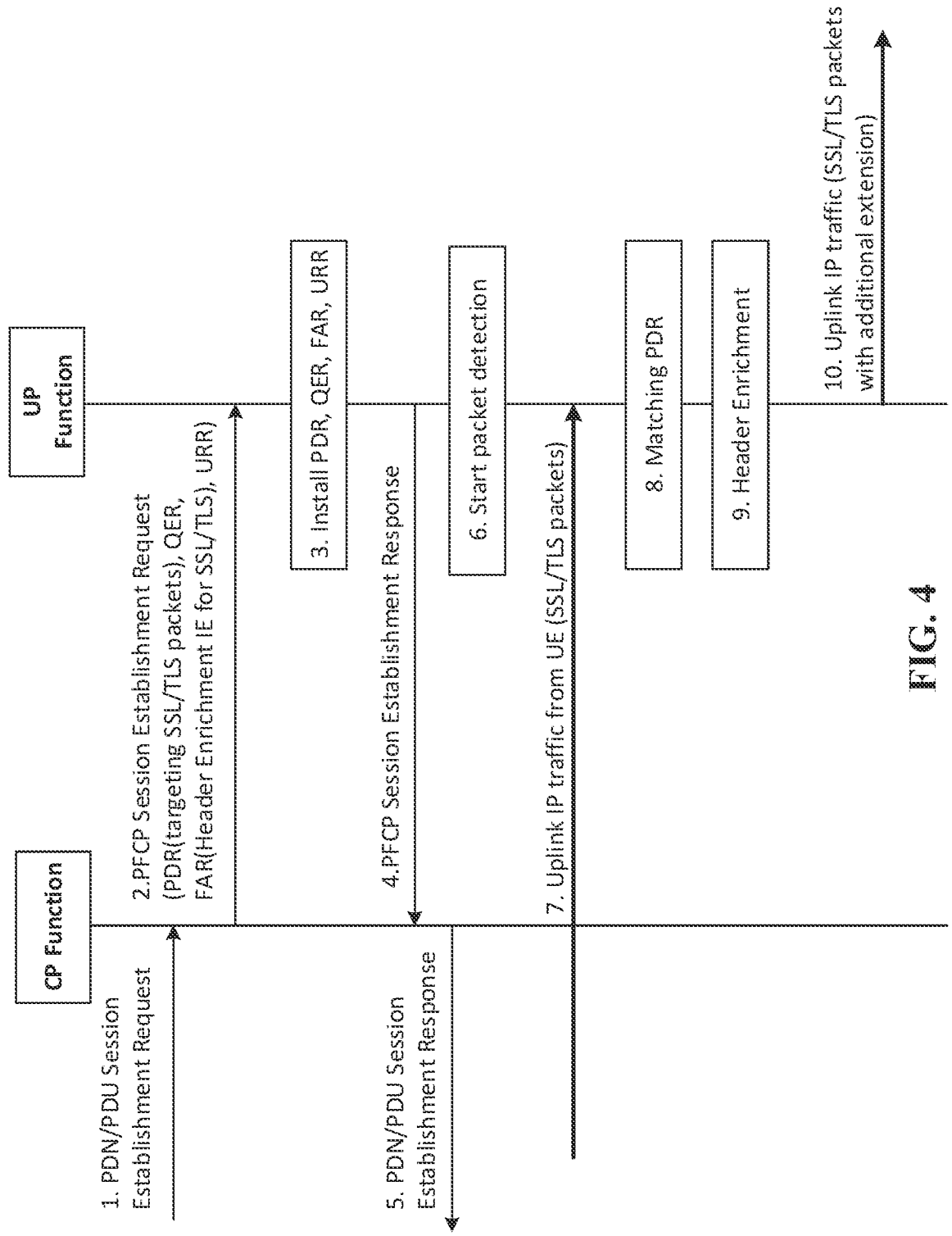
FIG. 4 shows an example of an enhancement to CP function and/or UP function to support the header enrichment for HTTPS (HTTP over SSL/TLS) based on some example embodiments of the disclosed technology.

FIG. 4 shows an example of an enhancement to CP function and/or UP function to support the header enrichment for HTTPS (HTTP over SSL/TLS) based on some example embodiments of the disclosed technology.

During the PFCP session establishment/modification procedure, the CP function provides necessary information to the UPF to instruct the UP function to perform the header enrichment for HTTPS.

In some embodiments of the disclosed technology, the header enrichment for HTTPS can include the operations discussed below.

Operation 1. The CP function is triggered to establish a PFCP session to the UP function. In some implementations, the CP function is triggered by either the PDN connection establishment request message from the MME (for 4G) or the PDU session establishment request message from the AMF (for 5G).

The CP function selects a proper UP function based on a data network name (DNN) and other information.

Operation 2. The CP function sends the PFCP session establishment request to the selected UP function, carrying the PDR, QER, FAR, and URR.

In some example implementations, in order to perform the header enrichment for HTTPS (HTTP over SSL/TLS), the CP function may provide appropriate PDR, in which at least one PDI (Packet Detection Information) is provided to filter out the outgoing SSL/TLS packets from the UE.

In some example implementations, in order to perform the header enrichment for HTTPS, the CP function may provide at least one FAR which is associated with the given PDR. Within the FAR, one or more header enrichment IEs are included. In one example, the header type of the given header enrichment IE is set to "TLS" or "SSL/TLS." In another example, the header type of the given header enrichment IE is set to "HTTPS". The head field name and header field value of the given header enrichment IE carries the name and its value of the header field to be inserted.

In order for the UP function to become aware that the PDR is targeting to detect SSL/TLS packets from the UE, the CP function provides at least one of the following indication information related to the HTTPS header enrichment.

In an implementation, in the PDR or in the SDF filter, a TLS indication (or HTTPS indication) configured to indicate that SSL/TLS (or HTTPS) is being used by the current service data flow. By checking the TLS indication (or HTTPS indication) either in the PDR or the SDF filter, the UP function knows the current service data flow uses SSL/TLS (HTTPS).

In another implementation, in the SDF filter, a well-known port for SSL/TLS protocol (i.e., 443) is used. The destination port of an SDF filter is set to the well-known port for SSL/TLS protocol, indicating that SSL/TLS is used by the current service data flow. By checking as to whether the destination port matches the well-known SSL/TLS port, the UP function can identify the use of SSL/TLS protocol by the current service data flow.

In another implementation, in the SDF filter, a pre-configured SSL/TLS port (e.g., a port other than 443) known by CP function and UP function is used. The destination port of an SDF filter is set to the pre-configured SSL/TLS port, indicating that SSL/TLS is used by the current service data flow. By checking as to whether the destination port matches the pre-configured SSL/TLS port, the UP function can identify the use of SSL/TLS protocol by the current service data flow.

In another implementation, in the FAR, the header type of header enrichment IE is set to one of the values of TLS, SSL/TLS, and HTTPS. By checking the specific value of header type, the UP function can identify the use of SSL/TLS protocol by the current service data flow.

With one of the above indication information, the UP function can identify the use of SSL/TLS by the service data flow identified by the PDR, and consequently can try to parse the SSL/TLS packets encapsulated in the received TCP packets.

Operation 3. Upon receiving the PFCP session establishment request from the CP function, the UP function installs the received PDR/QER/FAR/URR for the PFCP session.

Operation 4. The UP function sends back the PFCP session establishment response message to the CP function.

Operation 5. The CP function responds to the trigger entity of the PDN connection/PDU session establishment, by sending PDN connection/PDU session establishment response message.

Operation 6. The UP function starts to detect the uplink/downlink traffic from/to the UE and tries to match the receiving IP packets with the PDR(s). If incoming IP packets matches one PDR, the corresponding QER/URR/FAR shall be performed.

Operation 7. Subsequently, the UE initiates the uplink traffic towards the server. In this example, the UE sends a SSL/TLS connection request to the dedicated web server.

When HTTPS schema is used to a target web server, SSL/TLS connection shall first be established between the UE and the web server using an SSL/TLS handshake protocol. After the SSL/TLS handshake is successfully performed, all HTTP messages exchanged are encrypted in SSL/TLS packets. As the SSL/TLS handshake messages are exchanged in clear text, it gives the UP function possibility to insert additional information to the SSL/TLS handshake messages, e.g., to carry the CP function required header field name(s) and its value(s). The web server thus is able to extract the inserted header field(s) and its value(s) from the SSL/TLS handshake messages.

Operation 8. The UP function inspects the uplink traffic from the UE and detects whether it can match one of the installed PDRs.

In some implementations, the UP function may detect whether the uplink traffic (SSL/TLS packets from the UE) matches the PDR targeting to detect the SSL/TLS packets from the UE. If so, the UP function performs Operation 9 as will be discussed below. Otherwise, the UP function can skip Operation 9.

Operation 9. The UP function performs the header enrichment for HTTPS (HTTP over SSL/TLS).

In some implementations, if the received SSL/TLS packets from the UE carry initial SSL/TLS handshake message, such as "Client Hello," the UP function inserts an additional SSL/TLS extension to the received SSL/TLS message, and put the CP function required header field name(s) and its value(s) in the additional SSL/TLS extension.

The SSL/TLS handshake protocol defines SSL/TLS extension which can be used to carry customized information. The intermediary node in the SSL/TLS message transmission path thus has the possibility to insert an additional SSL/TLS extension to carry service specific parameters. The intermediary node updates the length of the SSL/TLS packets, after inserting the additional SSL/TLS extension.

Operation 10. The UP function sends the altered SSL/TLS packets onwards. The altered SSL/TLS packets finally reach the target server, and the target server extracts the header field names and values from the additional SSL/TLS extension.

As shown in FIG. 4, the CP function instructs the UP function to inspect the SSL/TLS packets and provides the header field name(s) and its value(s). The UP function thus monitors the uplink SSL/TLS packets from the UE. If the uplink SSL/TLS packets carries the initial SSL/TLS handshake message from the UE, i.e., "Client Hello" message, the UP function thus insert an additional SSL/TLS extension to the SSL/TLS handshake message to carry the required header field name(s) and its value(s).

In some embodiments of the disclosed technology, CP function can provide PDR for detecting the SSL/TLS packets from/to the UE, and can provide FAR associated to the PDR. The FAR includes the Header Enrichment IE which includes the header type setting to HTTPS (or SSL/TLS), and the required header field name(s) and the value(s).

In some embodiments of the disclosed technology, CP function may further carry SSL/TLS indication information to notify the UP function that SSL/TLS will be used on the service data flow identified by the PDR.

The SSL/TLS indication information may be one of the following: an explicit indication (e.g., "SSL/TLS is used") to indicate that SSL/TLS protocol is being used on this service data flow. This indication can be either carried in the PDR, or in the SDF (Service Data Flow) filter; or within the SDF filter, the destination port is set to the well-known port used by the web server for SSL/TLS protocol (i.e., 443); or within the SDF filter, the destination port is set to a pre-configured port used by a web server for SSL/TLS protocol (e.g., a pre-configured port other than 443). By checking this pre-configured destination port, the UP Function knows the SSL/TLS protocol is used; or within Header Enrichment IE of the FAR associated to the indicated PDR, the header type is set to one of values of TLS, SSL/TLS, and HTTPS.

In some embodiments of the disclosed technology, UP function may install the PDR and the associated FAR provided by the CP function; determine that SSL/TLS is used on the service data flow identified by the PDR; and start monitoring the uplink traffic from the UE. If the uplink traffic is detected as SSL/TLS handshake messages, the UP function inserts the additional extensions to the received SSL/TLS packets.

In some embodiments of the disclosed technology, a method of digital communication may include sending, TLS (or HTTPS) detection information, to a UP function to instruct the UP function to detect an SSL/TLS (or HTTPS) message from the UE.

In some implementations, the TLS (HTTPS) detection information is one of a TLS indication (or HTTPS indication) in the PDR or in the SDF filter.

In some implementations, the TLS (HTTPS) detection information is one of a well-known port for SSL/TLS protocol in the SDF filter or a pre-configured SSL/TLS port (e.g., a port other than 443) known by CP function and UP function in the SDF Filter.

In some implementations, the TLS (HTTPS) detection information is the header type of header enrichment IE set to one of values of TLS, SSL/TLS, and HTTPS.

In some embodiments of the disclosed technology, a method of digital communication may include sending HTTPS header enrichment information to a UP function to instruct the UP function to insert customized headers to the SSL/TLS message from the UE.

In some implementations, the HTTPS header enrichment information is the header type of header enrichment IE set to one of values of TLS, SSL/TLS, and HTTPS, and the header field names and the values to be inserted.

In some embodiments of the disclosed technology, a method of digital communication may include receiving TLS (or HTTPS) detection information from a CP function, and detecting SSL/TLS (or HTTPS) message from the UE.

In some implementations, the TLS (HTTPS) detection information is one of a TLS indication (or HTTPS indication) in the PDR or in the SDF filter.

In some implementations, the TLS (HTTPS) detection information is one of a well-known port for SSL/TLS protocol in the SDF Filter or a pre-configured SSL/TLS port (e.g., a port other than 443) known by CP function and UP function in the SDF filter.

In some implementations, the TLS (HTTPS) detection information is the header type of header enrichment IE set to one of values of TLS, SSL/TLS, and HTTPS.

In some embodiments of the disclosed technology, a method of digital communication may include receiving HTTPS header enrichment information from CP function and inserting required header field names and values to the detected SSL/TLS message.

In some implementations, the HTTPS Header Enrichment Information is the header type of header enrichment IE set to one of values of TLS, SSL/TLS, and HTTPS, and the header field names and the values to be inserted.

In some implementations, inserting required header field names and values to the detected SSL/TLS message may include detecting that the uplink IP packets from the UE is SSL/TLS packets carrying SSL/TLS handshake message, inserting an additional SSL/TLS extension to the SSL/TLS handshake message, and inserting the required header field names and values in the inserted SSL/TLS extension.

In some implementations, the SSL/TLS handshake message is the SSL/TLS handshake message from the client such as "Client Hello."

FIG. 5 shows an example of a data communication method based on some example embodiments of the disclosed technology.

In some embodiments of the disclosed technology, a data communication method 500 includes, at 510, transmitting, by a first communication component, to a second communication component, a session message instructing the second communication component to detect one or more messages from a user device based on a communication security protocol, wherein the session message includes detection information for the communication security protocol.

In the context of this patent document, the word "first communication component" may be used to indicate the CP function, and the word "second communication component" can be used to indicate the UP function.

FIG. 6 shows another example of a data communication method based on some example embodiments of the disclosed technology.

In some embodiments of the disclosed technology, a data communication method 600 includes, at 610, transmitting, by a first communication component, to a second communication component, a session message instructing the second communication component to insert one or more customized headers into one or more messages from a user device based on a communication security protocol, wherein the session message includes header enrichment information associated with the one or more messages from the user device based on the communication security protocol.

Figure 7:
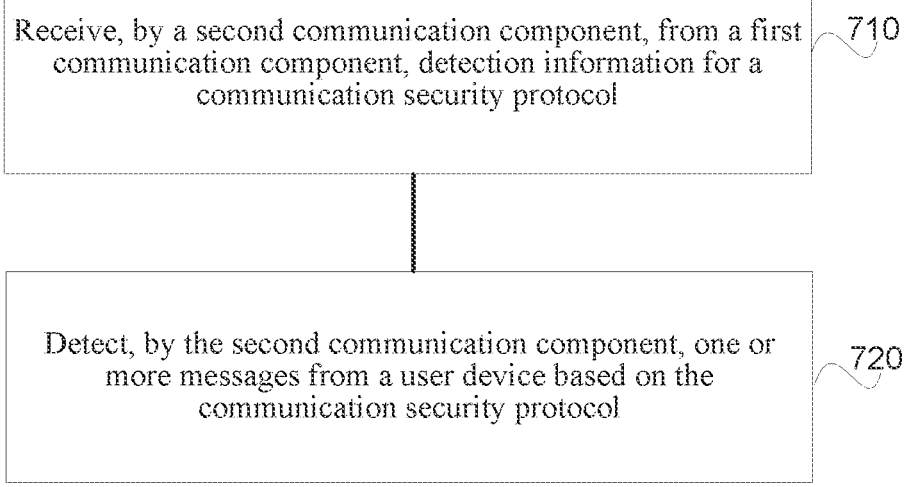
FIG. 7 shows another example of a data communication method based on some embodiments of the disclosed technology.

FIG. 7 shows another example of a data communication method based on some example embodiments of the disclosed technology.

In some embodiments of the disclosed technology, a data communication method 700 includes, at 710, receiving, by a second communication component, from a first communication component, detection information for a communication security protocol, and at 720, detecting, by the second communication component, one or more messages from a user device based on the communication security protocol.

Figure 8:
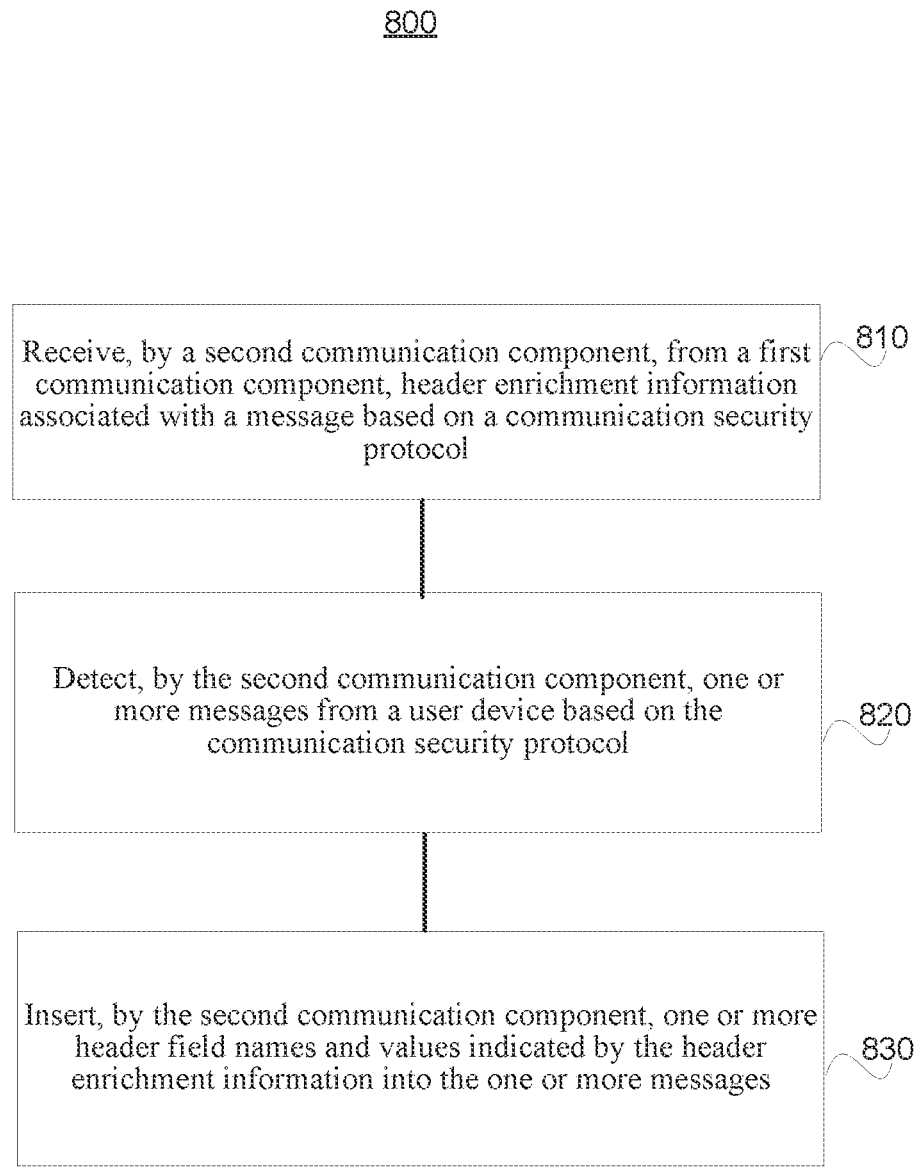
FIG. 8 shows another example of a data communication method based on some embodiments of the disclosed technology.

FIG. 8 shows another example of a data communication method based on some example embodiments of the disclosed technology.

In some embodiments of the disclosed technology, a data communication method 800 includes, at 810, receiving, by a second communication component, from a first communication component, header enrichment information associated with a message based on a communication security protocol, at 820, detecting, by the second communication component, one or more messages from a user device based on the communication security protocol, and at 830, inserting, by the second communication component, one or more header field names and values indicated by the header enrichment information into the one or more messages.

Figure 9:
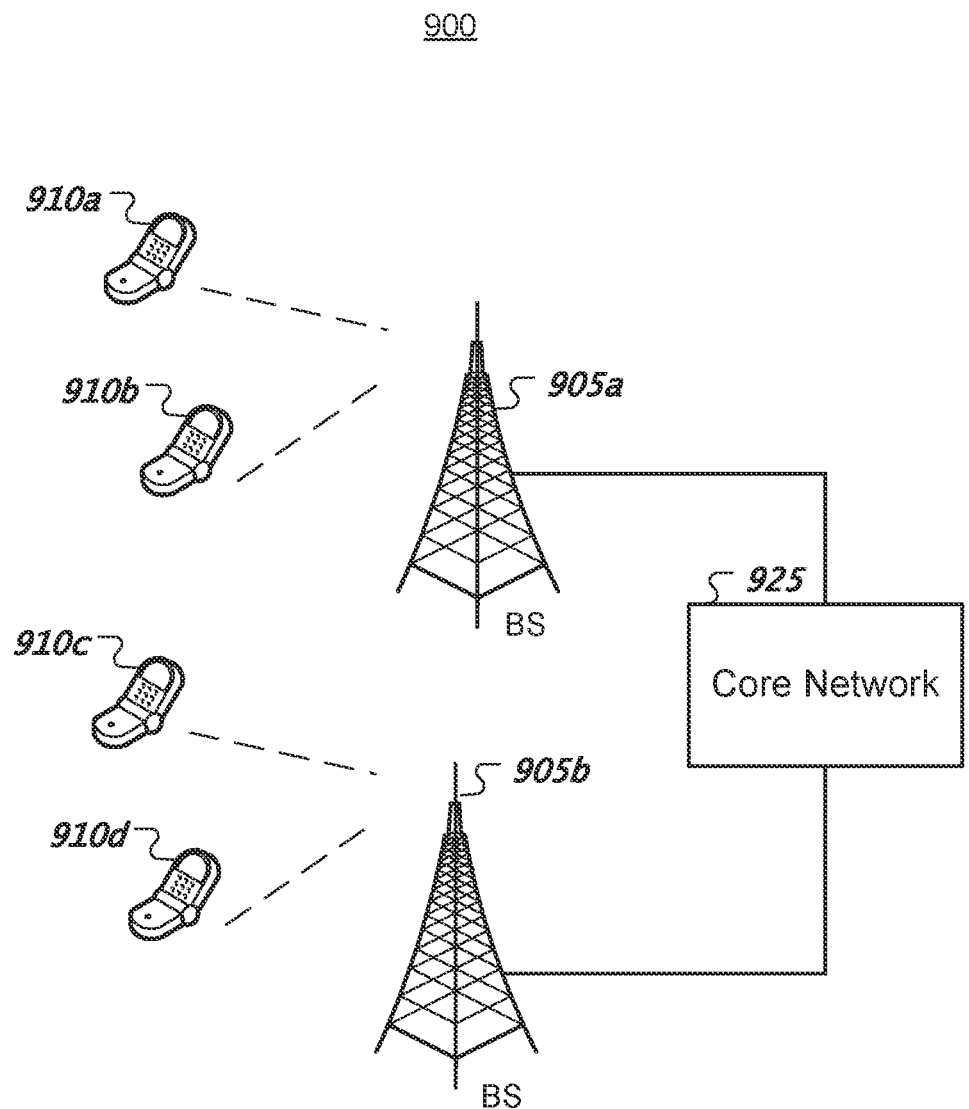
FIG. 9 shows an example of a wireless communication system 900 where techniques in accordance with one or more embodiments of the present technology can be applied.

FIG. 9 shows an example of a wireless communication system 900 where techniques in accordance with one or more embodiments of the present technology can be applied. A wireless communication system 900 can include one or more base stations (BSs) 905a, 905b, one or more wireless devices 910a, 910b, 910c, 910d, and a core network 925. A base station 905a, 905b can provide wireless service to wireless devices 910a, 910b, 910c and 910d in one or more wireless sectors. In some implementations, a base station 905a, 905b includes directional antennas to produce two or more directional beams to provide wireless coverage in different sectors.

The core network 925 can communicate with one or more base stations 905a, 905b. The core network 925 provides connectivity with other wireless communication systems and wired communication systems. The core network may include one or more service subscription databases to store information related to the subscribed wireless devices 910a, 910b, 910c, and 910d. A first base station 905a can provide wireless service based on a first radio access technology, whereas a second base station 905b can provide wireless service based on a second radio access technology. The base stations 905a and 905b may be co-located or may be separately installed in the field according to the deployment scenario. The wireless devices 910a, 910b, 910c, and 910d can support multiple different radio access technologies. The techniques and embodiments described in the present document may be implemented by the base stations of wireless devices described in the present document.

Figure 10:
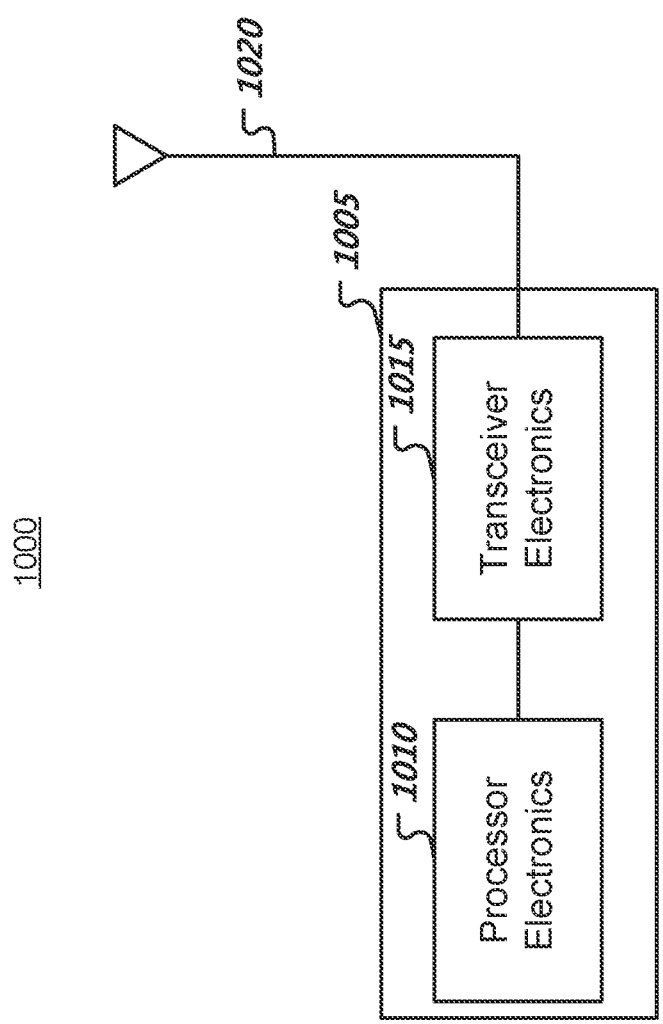
FIG. 10 is a block diagram representation of a portion of a radio station in accordance with one or more embodiments of the present technology can be applied.

FIG. 10 is a block diagram representation of a portion of a radio station in accordance with one or more embodiments of the present technology can be applied. A radio 1005 such as a base station or a wireless device (or UE) can include processor electronics 1010 such as a microprocessor that implements one or more of the wireless techniques presented in this document. The radio 1005 can include transceiver electronics 1015 to send and/or receive wireless signals over one or more communication interfaces such as antenna 1020. The radio 1005 can include other communication interfaces for transmitting and receiving data. Radio 1005 can include one or more memories (not explicitly shown) configured to store information such as data and/or instructions. In some implementations, the processor electronics 1010 can include at least a portion of the transceiver electronics 1015. In some embodiments, at least some of the disclosed techniques, modules or functions are implemented using the radio 1005. In some embodiments, the radio 1005 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A data communication method, comprising: transmitting, by a first communication component, to a second communication component, a session message instructing the second communication component to detect one or more messages from a user device based on a communication security protocol, wherein the session message includes detection information for the communication security protocol. In some implementations, the first communication component includes CP function and the second communication component includes UP function.

Clause 2. The method of clause 1, wherein the communication security protocol includes at least one of secure sockets layer (SSL), transport layer security (TLS), or hypertext transfer protocol secure (HTTPS).

Clause 3. The method of any of clauses 1-2, wherein the detection information includes an indication for at least one of the transport layer security (TLS) or the hypertext transfer protocol secure (HTTPS) in at least one of a packet detection rule or a service data flow filter. In some implementations, the packet detection rule can indicate PDR, and service data flow filter can indicate SDF filter.

Clause 4. The method of clause 3, wherein the packet detection rule includes packet detection information configured to filter out one or more outgoing SSL or TLS packets from the user device.

Clause 5. The method of clause 3, wherein the service data flow filter is associated with the packet detection rule.

Clause 6. The method of any of clauses 1-2, wherein the detection information includes at least one of a well-known port for an SSL or TLS protocol in a service data flow filter, or a pre-configured port for SSL or TLS protocol in the service data flow filter known by the first and second communication components.

Clause 7. The method of any of clauses 1-2, wherein the detection information includes a header type of a header enrichment information element set to a value corresponding to at least one of TLS, SSL/TLS, or HTTPS. In some implementations, the header enrichment information element can indicate Header Enrichment IE.

Clause 8. The method of clause 7, wherein the header enrichment information element is included in a forwarding action rule (FAR).

Clause 9. A data communication method, comprising: transmitting, by a first communication component, to a second communication component, a session message instructing the second communication component to insert one or more customized headers into one or more messages from a user device based on a communication security protocol, wherein the session message includes header enrichment information associated with the one or more messages from the user device based on the communication security protocol.

Clause 10. The method of clause 9, wherein the communication security protocol includes at least one of secure sockets layer (SSL), transport layer security (TLS), or hypertext transfer protocol secure (HTTPS).

Clause 11. The method of any of clauses 9-10, wherein the header enrichment information includes a header type of a header enrichment information element set to a value corresponding to at least one of TLS, SSL/TLS, or HTTPS e.

Clause 12. The method of clause 11, wherein the header enrichment information element is included in a forwarding action rule (FAR).

Clause 13. The method of any of clauses 9-10, wherein the header enrichment information includes header field names and values to be inserted into the one or more messages from the user device.

Clause 14. The method of any of clauses 1-13, further comprising receiving, by the first communication component, a trigger entity of a packet data network connection establish request or a packet data unit session establishment request, and transmitting, by the first communication component, a packet data network connection establishment response or a packet data unit session establishment response.

Clause 15. A data communication method, comprising receiving, by a second communication component, from a first communication component, detection information for a communication security protocol, and detecting, by the second communication component, one or more messages from a user device based on the communication security protocol.

Clause 16. The method of clause 15, wherein the communication security protocol includes at least one of secure sockets layer (SSL), transport layer security (TLS), or hypertext transfer protocol secure (HTTPS).

Clause 17. The method of any of clauses 15-16, wherein the detection information includes an indication for at least one of the transport layer security (TLS) or the hypertext transfer protocol secure (HTTPS) in at least one of a packet detection rule or a service data flow filter.

Clause 18. The method of clause 17, wherein the detecting the one or more messages from a user device based on the detection information includes determining that the one or more message uses at least one of the transport layer security (TLS) or the hypertext transfer protocol secure (HTTPS) by checking the indication in the packet detection rule or the service data flow filter.

Clause 19. The method of any of clauses 15-16, wherein the detection information includes at least one of a well-known port for an SSL or TLS protocol in a service data flow filter, or a pre-configured port for SSL or TLS protocol in the service data flow filter known by the first and second communication components.

Clause 20. The method of clause 15, wherein the detecting the one or more messages from a user device based on the detection information includes determining whether a destination port matches the well-known port for the SSL or TLS protocol, and determining, upon determination that the destination port matches the well-known port for the SSL or TLS protocol, that a current service data flow uses the SSL or TLS protocol.

Clause 21. The method of any of clauses 15-16, wherein the detection information includes a header type of a header enrichment information element set to a value corresponding to at least one of TLS, SSL/TLS, or HTTPS.

Clause 22. The method of clause 21, wherein the detecting the one or more messages from a user device includes, upon determination that the header type of the header enrichment information element is set to a value corresponding to at least one of TLS, SSL/TLS, or HTTPS, determining that a current service data flow uses the SSL or TLS protocol.

Clause 23. The method of any of clauses 15-22, further comprising parsing encapsulated SSL or TLS packets of the one or more messages.

Clause 24. The method of clause 15, further comprising, upon receiving a packet forwarding control protocol (PFCP) session establishment request from the first communication component, installing, by the second communication component, at least one of packet detection rule (PDR), QOS enforcement rule (QER), forwarding action rule (FAR), or usage reporting rule (URR).

Clause 25. The method of clause 24, further comprising transmitting, by the second communication component, a packet forwarding control protocol (PFCP) session establishment response.

Clause 26. A data communication method, comprising receiving, by a second communication component, from a first communication component, header enrichment information associated with a message based on a communication security protocol, detecting, by the second communication component, one or more messages from a user device based on the communication security protocol, and inserting, by the second communication component, one or more header field names and values indicated by the header enrichment information into the one or more messages.

Clause 27. The method of clause 26, wherein the communication security protocol includes at least one of secure sockets layer (SSL), transport layer security (TLS), or hypertext transfer protocol secure (HTTPS).

Clause 28. The method of any of clauses 26-27, wherein the header enrichment information includes a header type of a header enrichment information element set to a value corresponding to at least one of TLS, SSL/TLS, or HTTPS.

Clause 29. The method of any of clauses 26-27, wherein the header enrichment information includes one or more header field names and values to be inserted into the message.

Clause 30. The method of any of clauses 26-27, wherein the inserting the one or more header field names and values indicated by the header enrichment information into the one or more messages comprises detecting one or more uplink IP packets from the user device are secure sockets layer (SSL) or transport layer security (TLS) packets carrying an SSL or TLS handshake message, and inserting additional an SSL or TLS extension to the SSL or TLS handshake message while placing the one or more header field names and values indicated by the header enrichment information in the inserted an SSL or TLS extension.

Clause 31. The method of clause 30, wherein the SSL or TLS handshake message includes an SSL or TLS handshake message from a client initiating a handshake procedure.

Clause 32. The method of clause 30, further comprising, upon determination that the SSL or TLS handshake message are exchanged in a clear text, inserting, by the second communication component, additional information to the SSL or TLS handshake message.

Clause 33. The method of clause 32, wherein the additional information includes one or more header field names and values.

Clause 34. The method of any of clauses 1-33, wherein the first communication component includes a control plane (CP) function, and the second communication component includes a user plane (UP) function.

Clause 35. An apparatus for wireless communication, comprising a memory and a processor, wherein the processor reads code from the memory and implements a method recited in any of clauses 1 to 34.

Clause 36. A computer readable program storage medium having code stored thereon, the code, when executed by a processor, causing the processor to implement a method recited in any of clauses 1 to 34.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A data communication method, comprising:
  transmitting, by a first communication component, to a second communication component, a session message instructing the second communication component to perform operations comprising:
  detecting a handshake message from a user device based on a communication security protocol, wherein the communication security protocol comprising at least one of secure sockets layer (SSL), transport layer security (TLS), or hypertext transfer protocol secure (HTTPS);
  identifying, based on the session message, at least one header field name and a corresponding value;
  inserting, into the handshake message, the at least one header field name and a corresponding value as an additional extension for the communication security protocol; and
  forwarding, to a server, a modified handshake message that includes the additional extension,
  wherein the session message includes detection information indicating use of the communication security protocol and header enrichment information including the at least one header field name and the corresponding value.

2. The method of claim 1, wherein the detection information includes an indication for at least one of transport layer security (TLS) or hypertext transfer protocol secure (HTTPS) in at least one of a packet detection rule or a service data flow filter.

3. The method of claim 1, wherein the detection information includes at least one of a well-known port for an SSL or TLS protocol in a service data flow filter, or a preconfigured port for SSL or TLS protocol in the service data flow filter known by the first and second communication components.

4. The method of claim 1, wherein the header enrichment information includes a header type of a header enrichment information element set to a value corresponding to at least one of TLS, SSL/TLS, or HTTPS.

5. The method of claim 1, wherein the header enrichment information includes header field names and values to be inserted into the handshake message from the user device.

6. The method of claim 1, further comprising:
  receiving, by the first communication component, a trigger entity of a packet data network connection establish request or a packet data unit session establishment request; and
  transmitting, by the first communication component, a packet data network connection establishment response or a packet data unit session establishment response.

7. A data communication method, comprising:
  receiving, by a second communication component, from a first communication component, a session message including detection information indicating use of a communication security protocol that includes at least one of secure sockets layer (SSL), transport layer security (TLS), or hypertext transfer protocol secure (HTTPS), and header enrichment information including at least one header field name and a corresponding value;
  detecting, by the second communication component, a handshake message from a user device based on the communication security protocol;
  identifying, from the session message, the at least one header field name and the corresponding value;
  inserting, by the second communication component, into the handshake message, the at least one header field name and the corresponding value as an additional extension for the communication security protocol; and
  forwarding, to a server, a modified handshake message that includes the additional extension.

8. The method of claim 7, wherein the detection information includes an indication for at least one of transport layer security (TLS) or hypertext transfer protocol secure (HTTPS) in at least one of a packet detection rule or a service data flow filter.

9. The method of claim 7, wherein the detection information includes at least one of a well-known port for an SSL or TLS protocol in a service data flow filter, or a preconfigured port for SSL or TLS protocol in the service data flow filter known by the first and second communication components.

10. The method of claim 7, wherein the detecting the handshake message from a user device based on the detection information includes:
  determining whether a destination port matches a well-known port for secure sockets layer (SSL) or transport layer security (TLS) protocol; and
  determining, upon determination that the destination port matches the well-known port for the SSL or TLS protocol, that a current service data flow uses the SSL or TLS protocol.

11. The method of claim 7, wherein the detection information includes a header type of a header enrichment information element set to a value corresponding to at least one of TLS, SSL/TLS, or HTTPS.

12. The method of claim 7, further comprising parsing encapsulated SSL or TLS packets of the handshake message.

13. The method of claim 7, further comprising, upon receiving a packet forwarding control protocol (PFCP) session establishment request from the first communication component, installing, by the second communication component, at least one of packet detection rule (PDR), QoS enforcement rule (QER), forwarding action rule (FAR), or usage reporting rule (URR).

14. A data communication method, comprising:
- receiving, by a second communication component, from a first communication component, a session message that includes header enrichment information including at least one header field name and a corresponding value;
- detecting, by the second communication component, a handshake message from a user device based on a communication security protocol that includes at least one of secure sockets layer (SSL), transport layer security (TLS), or hypertext transfer protocol secure (HTTPS);
- inserting, by the second communication component, into the handshake message, the at least one header field name and the corresponding value as an additional extension for the communication security protocol; and
- forwarding, to a server, a modified handshake message that includes the additional extension.

15. The method of claim 14, wherein the header enrichment information includes a header type of a header enrichment information element set to a value corresponding to at least one of TLS, SSL/TLS, or HTTPS.

16. The method of claim 14, wherein the header enrichment information includes one or more header field names and values to be inserted into the message.

17. The method of claim 14, wherein the inserting the at least one header field name and a corresponding value into the handshake message comprises:
- detecting one or more uplink IP packets from the user device are secure sockets layer (SSL) or transport layer security (TLS) packets carrying an SSL or TLS handshake message; and
- inserting an additional SSL or TLS extension to the SSL or TLS handshake message while placing the one or more header field names and values indicated by the header enrichment information in the inserted additional SSL or TLS extension.

* * * * *